Oct. 2, 1956     E. P. WENZELBERGER     2,764,880
FREEZING APPARATUS

Original Filed April 4, 1950                  4 Sheets-Sheet 1

INVENTOR
E. P. Wenzelberger
By Toulmin & Toulmin
ATTORNEYS

Oct. 2, 1956　　　　E. P. WENZELBERGER　　　　2,764,880
FREEZING APPARATUS
Original Filed April 4, 1950　　　　　　　　　　4 Sheets-Sheet 2

INVENTOR
E. P. Wenzelberger
By Toulmin & Toulmin
ATTORNEYS

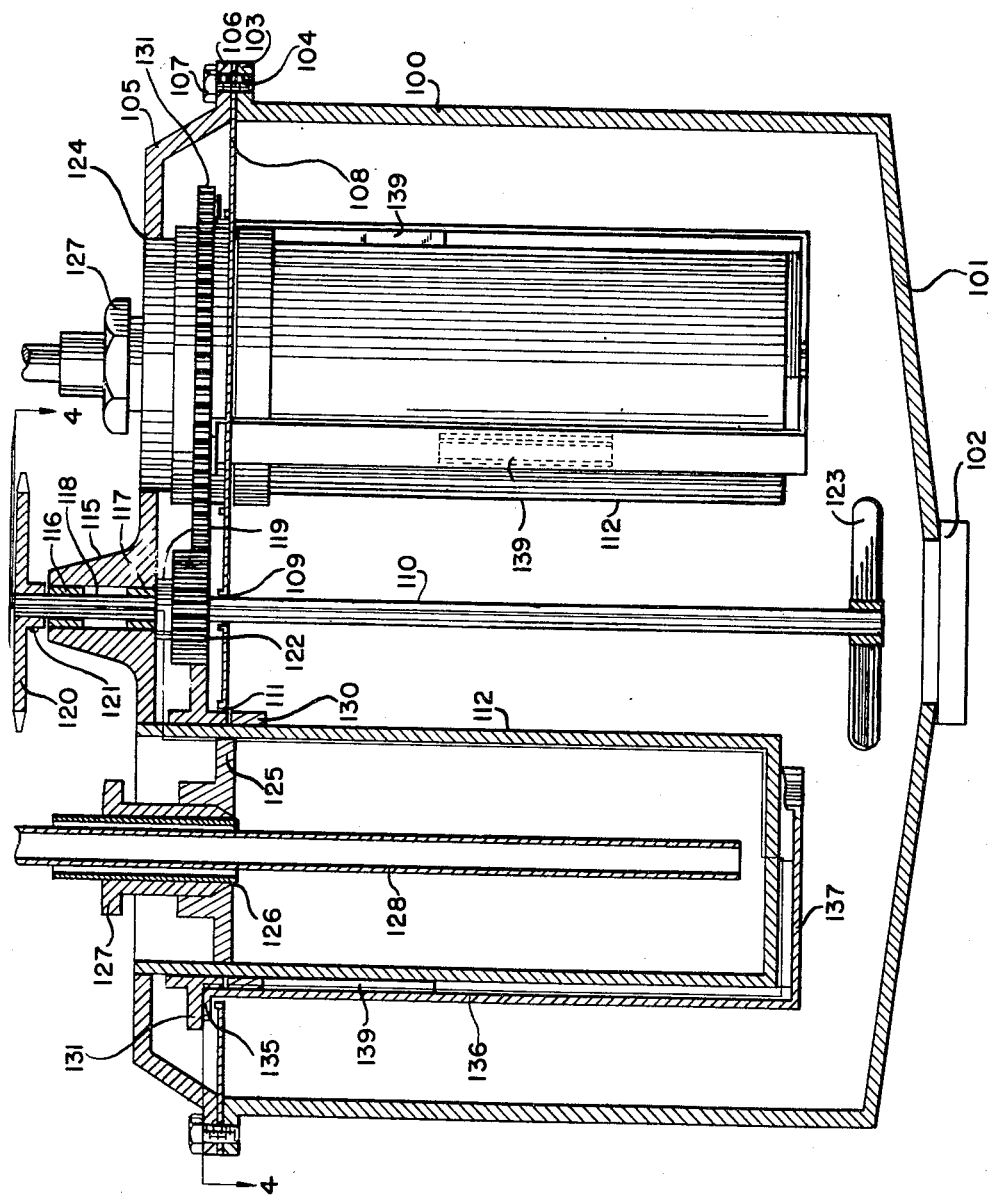

Oct. 2, 1956 E. P. WENZELBERGER 2,764,880
FREEZING APPARATUS
Original Filed April 4, 1950 4 Sheets-Sheet 4
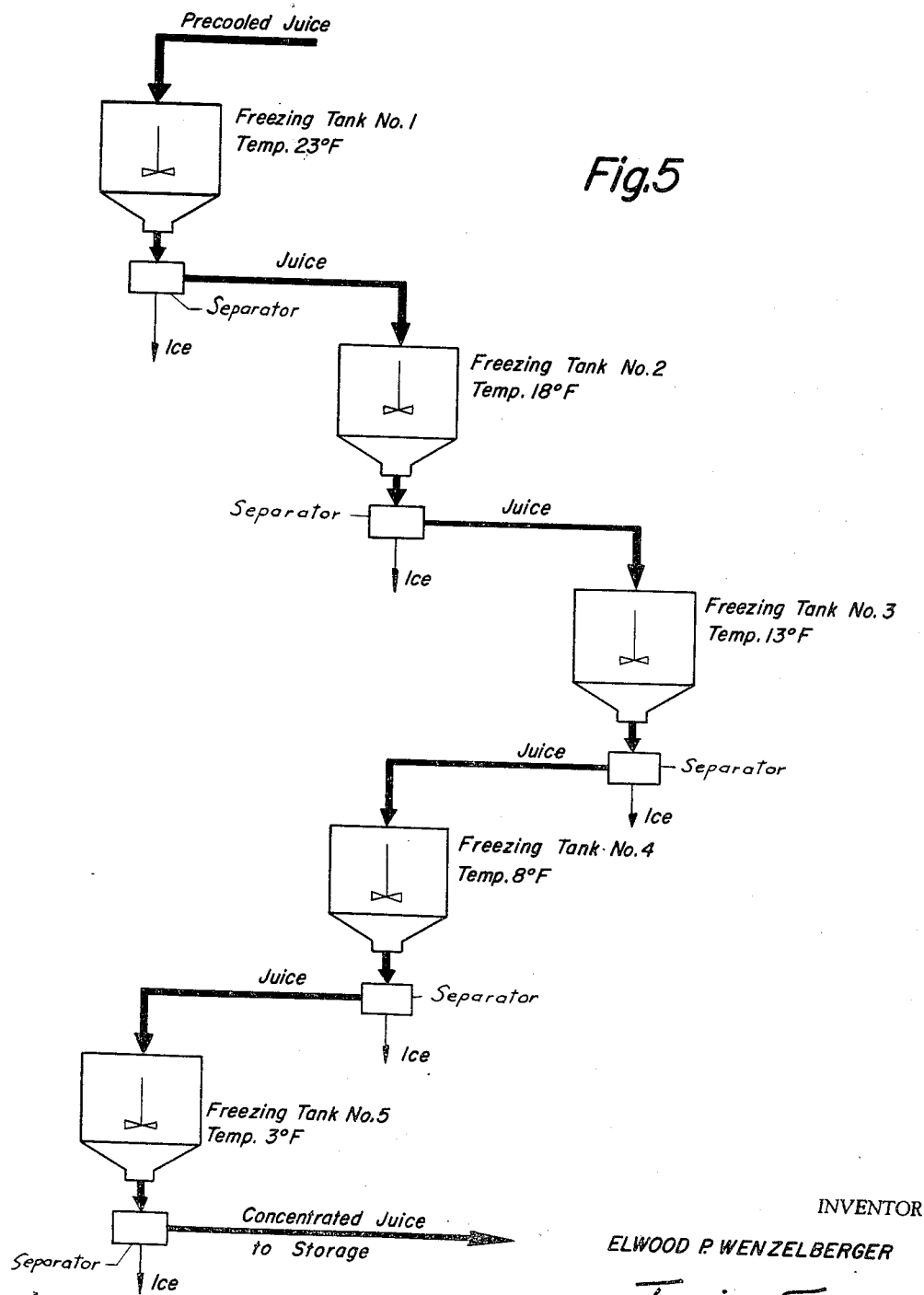
INVENTOR
ELWOOD P. WENZELBERGER
BY
ATTORNEYS

United States Patent Office 2,764,880
Patented Oct. 2, 1956

2,764,880

FREEZING APPARATUS

Elwood P. Wenzelberger, Dayton, Ohio, assignor to The Commonwealth Engineering Company of Ohio, Dayton, Ohio, a corporation of Ohio Original application April 4, 1950, Serial No. 153,806, now Patent No. 2,657,549, dated November 3, 1953. Divided and this application April 8, 1953, Serial No. 347,438

4 Claims. (Cl. 62—170)

This invention relates to a new and novel method of dehydrating solutions and/or suspensions by freezing and apparatus for carrying out the process. More particularly, it relates to freezing apparatus for rapid formation of pure ice at low differentials of temperature between freezing solution and coolant. Still more particularly, it relates to fruit juice freezing apparatus.

This application is a division of my application Serial No. 153,806, now United States Patent 2,657,549.

In the freezing of ice under normal conditions, the heat transfer is effected by imposing a large temperature differential between the coolant and the water. The quantity of heat transferred per square foot of heat transfer surface under such conditions is large and the sole factors to be considered are temperature of water, the quantity of water, and the temperature of the coolant.

Freezing of pure ice from solutions containing dissolved material such as salts and sugars and solid matter such as pulp fibers presents an entirely different problem.

By pure ice is meant crystal ice substantially free of occluded solution and/or solids. Pure ice may be distinguished readily from white ice because of the definitely fine crystal formation, presenting a mass of individual crystals in unagglomerated form.

It has been discovered that pure ice can only be frozen from fruit juice solutions and other heat sensitive compositions when the temperature differential between the solution and the coolant is of the order of 5 to 7° F.

It is a particular object of this invention to provide a rapid and economical means and method of removing water from fruit juices, beer, wines, pharmaceuticals such as antibiotics, heat sensitive resins, coffee, milk, and vegetable juices. This list is not exclusive, but is merely supplementary.

It is also an object of this invention to provide a method wherein the solvent of a solution is progressively frozen at temperatures which result in the formation of fine solvent crystals.

It is a further object of this invention to provide a stepwise freezing process wherein the solution is progressively dehydrated by removal of ice therefrom.

This results in a concentration from which nothing has been removed except the water and the water removal has been effected without detriment to vitamins, volatile flavoring oils, taste, and other characteristics of the product.

It is a still further object of the present invention to provide a stepwise freezing process wherein the solution is subjected to successive and lower temperature freezing steps, each of a small temperature differential between initial freezing and concentrated solution freezing point.

It is also an object to associate with this stage freezing system a high volume heat exchange capacity in association with means for rapidly changing the liquid interface in contact with freezing surfaces with means for ample cooling and with means for providing a flow of refrigerant capable of removing the heat as fast as it is transferred through the heat exchange interface. The ice thus formed is a fine crystalline ice slush having a large ice crystal area.

It is to be understood that if white ice forms it is exceedingly difficult to remove and has a tendency to clog and plug the mechanism and causes great difficulty in the entrainment of juices and solids.

It is another advantage of this method that it is unnecessary to fortify the resulting product with raw juice. It is the current commercial practice with vacuum treated orange juice, as an example, to fortify the juice when hedydrated by adding about 25% of raw juice.

Concentration by my method can be carried out to a high degree with no injury to the juice and it can be reconstituted in the hands of the user by the addition of requisite water. Nothing is lost from the juice except water, and nothing is added. Heat is eliminated so as not to disturb heat sensitive materials e. g., volatile flavoring constituents of the substance, being processed.

It is a purpose of this invention to provide apparatus for freezing ice from solutions such as fruit juices which bring the time for effective freezing into a reasonable processing period.

It is another object of this invention to provide apparatus for freezing ice from solutions such as fruit juices wherein the ratio of surface area to liquid volume is in the ratio of greater than 1 square foot per 2 gallons of solution.

It is a further object of this invention to provide apparatus which requires a minimum of floor space while having a large processing capacity.

In the light of the foregoing, various other objects and advantages will be apparent from the following description taken in connection with the drawings, in which:

Figure 3 is a side elevational view of another embodiment of the invention also disclosing one freezing unit in vertical cross section;

Figure 5 illustrates a flow sheet for carrying out the freezing dehydration treatment of orange juice.

Figure 1:
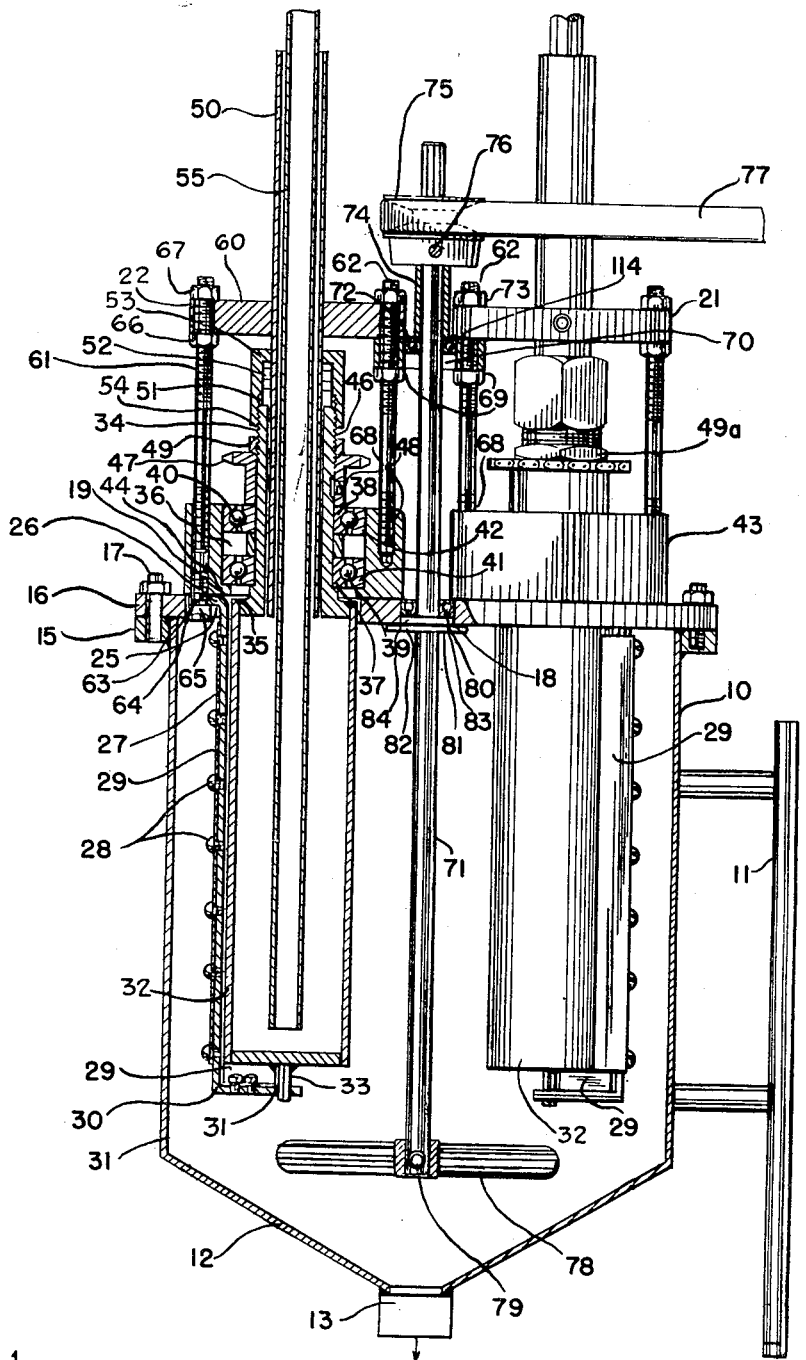
Figure 1 is a side elevational view showing the internal arrangement of a freezing chamber and disclosing one freezing unit in vertical cross section and arranged to deliver the slushy refrigerated mass to a centrifuge which is illustrated diagrammatically.

Briefly, the process of this invention comprises lowering the temperature of a liquid composition below the solidification temperature of the solvent therein, continuously supplying ice crystal nuclei to said composition by continuous separation of initiated ice crystals from the heat transfer surface, agitating the composition to control the ice crystal size and growth, and removing the ice crystals leaving the liquid composition at least partially dehydrated.

The principle upon which this process is based is the formation of pure ice crystals, a large proportion of which are formed as crystal nuclei and immediately after formation are scraped off the freezing or heat exchange surface.

The crystal nuclei are distributed to grow in the composition under agitating conditions controlling the crystal size, thus avoiding formation of white ice which occludes solids, freezes to large agglomerates and prevents clean separations of ice and liquid.

In this freezing operation, there is a limited quantity of water which is convertible to solid ice at a temperature imposed upon any identical freezing step. This quantity of water or freezing potential is that amount which must be removed to produce a composition having a freezing point which is equal to the imposed temperature.

Elimination of this water as ice crystals comes about through growth of ice crystal nuclei to ice crystals separable from the slushy liquid composition by means of, for example, a centrifuge.

Since white ice results from growth of crystals to too great a size, the control of crystallization is a vital factor. The greater the number of ice crystals growing in the composition, the quicker the dissipation of freezing potential and the smaller will be the average size ice crystals.

The instant invention by removing ice from the cooling surface as it is formed, distributes throughout the freezing composition a large number of ice crystal nuclei which grow as long as there is solidifying potential.

Ice formation being continuous at the cooling surface, a continuous stream of ice crystal nuclei are being formed and being separated from the surface for distribution in the composition.

The result is a continuously multiplying number of growing crystals which are so numerous that, under the conditions of agitation, none grow large enough to alter their character from crystal ice to white ice.

When there is a relatively small differential between the initial ice forming point of water of the solution and the temperature maintained in the container by the refrigerating medium, the transformation of water to ice takes place within a time interval, within which interval the ice forming point of the solution is lowered to approximately the temperature imposed upon the solution in the container and ice formation ceases, the time interval being determined by the rate of heat transfer to the refrigerating medium.

The heat transfer, it has been found, can be effected while maintaining small temperature differentials, if a ratio of one square foot of refrigerating surface for each one to one and a half gallons or less of liquid is maintained.

When such ratios are held substantially constant, the time period, for example, 12 to 20 minutes, remains substantially constant regardless of the quantity of liquid being processed.

To be commercially feasible the process must have a high volume capacity. In this system the capacity is great because the time interval for maximum ice formation is under direct control at all times and the series of containers integrated in their operation, so that liquid only stays in each tank long enough for formation of the maximum ice content or ice crystals of maximum size for that temperature, and as a consequence thereof reaches the maximum concentration for that stage before the resultant solution is moved to the next container, whose temperature is lower than the temperature at which ice will again form in the solution. The result of this repetitive series of batch freezing tank operations is to produce gradual but uniform crystal growth.

If this uniform heat transfer were to be accomplished without any agitation, large crystals would form. The type of agitation I use creates small crystals and serves two other functions.

A wiping blade agitator removes any ice which otherwise would cling to the heat exchange surfaces of the vessel. This is removed as fast as it forms. This ice immediately acts as a seeding process to grow more crystals throughout the volume of the liquid. This wiping agitation is performed by a relatively slow speed agitator of about 125 R. P. M.

The other agitator (at higher speed, i. e. about 800 to 900 R. P. M.) prevents large crystal growth, producing small pure ice crystals. It also prevents the crystals so formed from floating to the top of the liquid where they would aggregate and coalesce together to form a solid mass of ice which would occlude juice.

By forming large numbers of individual small crystals, continually in motion in the liquid, they remain unattached to each other with a uniform dispersion of ice crystals in the liquid medium. Being a liquid with ice slush it becomes easy to transport it or flow it through pipes from one piece of apparatus to another.

The tabulation given later is suggestive of the ratio of temperatures. It has been found that these temperatures, while typical, represent a rule of action that secures the desired result.

The maintenance of temperatures, which are continually being lowered, maintains the ice as individual crystals, solid in form and easily centrifuged.

This is in marked distinction to the results obtained where the ice is warmed for partial melting, or where white ice is formed having juice and solids occluded therein, and the ice takes on a physical character which will disrupt the process.

I have found that by first cooling a liquid bearing solids and adjusting the difference between the temperature of the liquid and the temperature of the refrigerant by a small differential of approximately 5 to 7 degrees, and then agitating by means of both agitating units the liquid bearing solids or dissolved material or both, the liquid will immediately form ice very rapidly.

Continuous agitation prevents localized cooling and ice formation at the normal congealing point, particularly in large crystals and in white ice.

This operational method secures the result of fine crystals in a large mass without occluding some of the solution or solids in the ice.

In order to obtain these fine crystals in a relatively pure form without solids, the temperature of the cooling liquid in each successive freezing step must be held practically at a constant temperature, the temperature being maintained at a predetermined lower temperature, below the ice forming temperature of the solution.

In order to speed the ice crystal formation under these conditions, the system must possess high heat exchange capacity. This may be brought about by first, agitation, which brings about rapid change of the liquid interface on contact with the freeze surfaces, secondly, by maintaining a ratio of one square foot of cooling surface for each one to one and a half gallon of solution being treated, and, thirdly, by maintaining the flow of refrigerant capable of removing a relatively large quantity of heat.

I also find it important that the major portion in many instances of the stages of progressively lowering the temperature shall be above zero, and I also find it important that the successive stages be at relatively small temperature reductions, such as about 5° and 7° F., and that the temperature of the liquid in the second stage should be approximately the temperature of the refrigerant in the first stage and so on. It will be understood that these differentials will vary with the liquids and the solids, but the principle of the operation remains the same.

By avoiding extremes of temperature, quick freezing and by maintaining easy stages of lowering temperatures and modest differentials between the refrigerant and the liquid while causing agitation, a steady freezing or small ice crystals will take place and rapid dehydration can be effected without occluding other liquids and solids than water.

By starting, as in the case of orange juice, at a tank temperature of 23° F. above zero, with an outside temperature of 18° F., then a temperature in the next tank of 18° F., with an outside temperature of 13° F., then a tank temperature of 13° F. with an outside temperature of 8° F., and in the fourth tank, a temperature of 8° F. with an outside temperature of 3° F., and in the last tank, a temperature of 3° F., with an outside temperature of −2° F., free clear ice crystals can be secured that are easily maintained by the stirrer, in free movement, with minimum crystal size and the maximum freezing capacity for the temperature applied. This principle of a multiple series of steps, starting the temperature just about at the freezing point of the juice and progressively reducing it and progressively removing water by freezing, enables this result to be secured.

A flow sheet illustrating this multi-stage freezing treatment of orange juice as described is shown in Figure 5 of the drawings.

The apparatus capable of carrying out the process of this invention comprises a chamber provided with inlet and outlet passages and a multiplicity of cylinders, each cylinder being provided with inlets and outlets for refrigerating medium.

Each cylinder or freezing unit comprises a circular shell and at least one freezing surface scraper, the shell and scrapers being adapted for movement relative to each other about a common axis.

The chamber is preferably circular if more than four freezing cylinders are to be installed therein. For four freezing cylinders a square chamber gives the best volume distribution.

Applicant has discovered that for tanks of this character having a ratio of gallons of liquid per unit of surface area of approximately 1.4 to 2 gallons per square foot, freezing of pure ice will occur at a 5° F. differential at any capacity in the above range for which heat transfer capacity is available in the refrigeration circulating unit. Tanks preferably are constructed having a ratio of gallons of liquid per unit of surface area in the range of approximately 1.5 gallons per square foot.

This ratio calculation may be illustrated simply by calculations relative to a tank 4 feet high and 44 inches in diameter having disposed therein 7 rotating cylinders each 1 foot in diameter. Each cylinder will have 12.55 square feet of surface. Each cylinder will take up the space of 23.5 gallons. The tank would have a total capacity of approximately 316 gallons. Deducting the space for 7 cylinders, the holding capacity will be 316 gallons −164.5=151.5 gallons. Thus 151.5÷88 square feet total for 7 cylinders equal 1.72 gallons per square foot of cooling surface.

In the drawing, the tank is illustrated as having 4 cylinders disposed therein. The ratio of volume of liquid to surface area is that with 4 cylinders in place the ratio is 1 gallon per square foot of surface. With 3 cylinders in place the ratio is approximately 1.25 gallons per square foot of surface. With 2 cylinders in place the ratio is approximately 1.75 gallons per square foot of surface.

Figure 2:
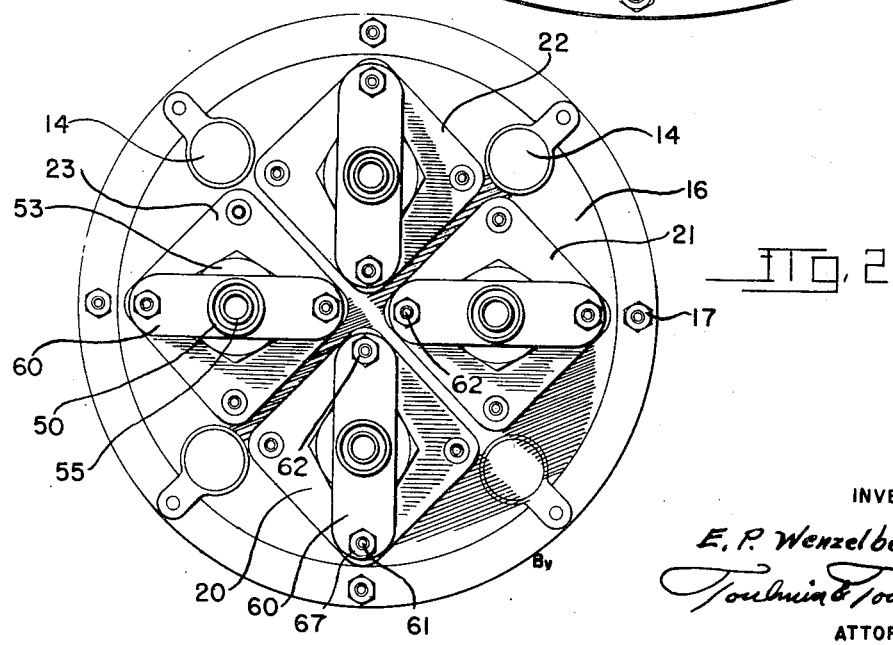
Figure 2 is a top plan view of the apparatus of Figure 1.

Referring to the drawings and specifically to Figures 1 and 2, the numeral 10 designates a circular shell. Shell 10 is supported by steel framework 11. Chamber 10 is provided with a conical bottom section 12 converging to a shell outlet 13. Shell 10 is also provided with a liquid inlet 14. Shell 10 is provided at the top with a flange 15.

Mounted on the top of shell 10 is a plate 16 secured to flange 15 by suitable means 17 such as studs.

The apparatus as illustrated is shown adapted to positioning four identical and identically mounted freezing units 20, 21, 22 and 23 and a central axial stirring unit 24. To accommodate these units, plate 16 is provided with an axial aperture 18 and four identical apertures 19 radially positioned. In the description of the apparatus reference will be made to a single unit except as otherwise specified, it being understood that the parts would carry like descriptions.

On the top side and adjacent the aperture 19 the surface is undercut at 25 to form a seat to receive a horizontal extension 26 of a support arm 27. Support arm 27 has secured thereto by suitable means 28, such as screws or rivets, a scraper blade 29 which rides in contact with both the sides and bottom of refrigeration cylinder 32.

Support arm 27 is provided with a horizontal projection 30 at the bottom. Projection 30 is adapted to receive a shaft or pin 33 on the bottom of the refrigeration cylinder 32. This pin 33 serves to hold the blade 29 mounted on the support 27 in fixed pressure contact with the surface of the rotating cylinder 32.

Cylinder 32 is supported for rotation by being secured to a tubular member 34 such as welding 35. Tubular member 34 has mounted thereon a suitable packing 36 and the spaced inner races 37 and 38 of ball bearing sets 39 and 40. The outer races 41 and 42 of ball bearing sets are positioned in a mounting or ball bearing housing 43.

Housing 43 is a unit of greater horizontal surface area than the apertures 19 for which the housing 43 is positioned so as to provide for attachment or securing means hereinafter described.

Housing 43 is internally bored for passage of tubular member 34 therethrough and is counterbored to form a shoulder 44 upon which rests the outer race 41.

Tubular unit 34 extends beyond the ball bearing races and is externally threaded as at 46. Adjacent the race 38 there is mounted on unit 34 a sprocket 47 having a set screw 48 to prevent the sprocket from rotating independent of tubular unit 34. The sprocket 47 is further secured by a lock nut 49. Sprocket 47 is mounted for actuation by a chain belt, not shown.

Mounted within the tubular unit 34 is a conduit 50. This conduit 50 is stationary and adapted for a sliding fit. To prevent leakage of refrigerant at the point where conduit 50 emerges from unit 34, there is mounted a brass support ring 51 and suitable packing 52, around which is a packing nut 53 threadedly mounted on tubular unit 34. Packing unit 53 may be secured against working loose by suitable means 54, such as a set screw of plastic material, a locking nut, or other suitable means.

Conduit 50 is an outlet pipe for refrigerant supplied to cylinder 32 through a pipe 55 mounted within conduit 50 and extending to a point adjacent the bottom of cylinder 32. To obtain rigidity and prevent lateral pressure from forcing the rotating mechanism out of alignment, conduit 50 is passed through a retainer plate 60 mounted on a pair of studs 61 and 62.

Stud 61 is threaded at its lower end. The lower end threads 63 engage the threads 64 of aperture 65 in plate 16. Stud 61 passes through one corner of mounting 43 in a sliding fit arrangement. The upper end of stud 61 is threaded and plate 60 vertically positioned by nuts 66 and 67.

Stud 62 is like threaded at its lower end and threadedly received in a threaded recess 68 in mounting 43. At its upper end bolt 62 is also threaded. There is threadedly mounted on each stud 62 a vertical positioning nut 69.

Seated on the four nuts 69 is a plate 70. Plate 70 is central axially bolted to receive a shaft 71. Plate 70 is counterbored at 72 to receive the races of the ball bearing 114 which support shaft 71. The inner end of plate 60 seats on plate 70 and the two held rigidly between nut 69 and a nut 73.

Surrounding shaft 71 is a spacer sleeve 74. The upper portion of shaft 71 carries a pulley 75 secured to the shaft by a set screw 76. The pulley 75 is adapted to be driven by a belt 77 from a source of power not shown.

Shaft 71 extends downwardly through aperture 18 in plate 16 to a point adjacent the conical bottom 12 of shell 10. Adjacent the bottom of shaft 71 there is mounted a transversely positioned stirring arm 78 secured thereto by suitable releaseable means 79 such as a bolt.

Inasmuch as shaft 71 is adapted for relatively high rotational speed, a second point for support is provided where said shaft passes through plate 16. Support is provided by means of ball bearings 80, the outer race 81 of which is adapted for press fitting into aperture 18. The races are supported on the underside by a projection 82 of a plate 83 which is likewise adapted for a press fit into the lower portion of aperture 18.

Plate 83 seals aperture 18 against leakage of liquid. The ball bearings held against dislocation upwardly by mountings 43, a corner of each of which contacts the outer race 81.

Figure 4:
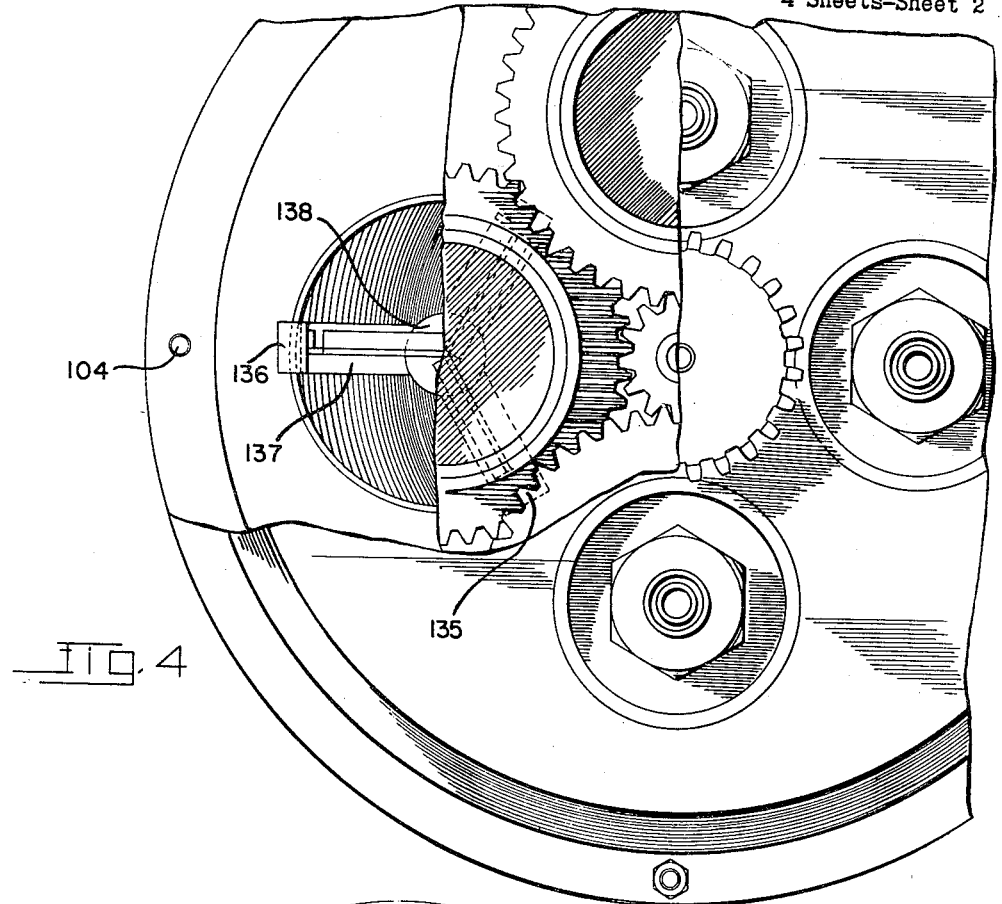
Figure 4 is a view along the line 4—4 of Figure 3.

Figures 3 and 4 represent another embodiment of the invention wherein the refrigeration cylinders are stationary and the scrapers are rotated. The numeral 100 designates the liquid container or shell, having a conical bottom portion 101 and an axially positioned outlet 102.

Shell 100 is provided at the top with an external flange 103. Flange 103 is provided with spaced threaded bores 104. Shell 100 is also provided with a top cover 105 adapted with a flange 106 and secured to shell 100 by suitable means 107 such as hex head bolts.

Positioned between shell 100 and cover 105 is a gasket plate 108 adapted to extend entirely across said shell. Gasket plate 108 is apertured at 109 to receive a central axially positioned shaft 110 and at four radially spaced positions 111 to provide passage for the four refrigerating cylinders 112 and associated mechanism as hereinafter described.

Cover 105 is provided at the central axial position with a truncated cone shaped outward projection 115. Projection 115 is axially bored and adapted to receive bushings 116 and 117 which in turn receive the upper portion 118 of shaft 110.

Intermediate its ends shaft 110 is provided with a collar 119. The upper end 118 of shaft 110 carried a sprocket 120 secured to the shaft by suitable means 121 such as a set screw or pin.

Adjacent the collar 119, there is mounted on shaft 110, a pinion gear 122. At the lower end of shaft 110 there is mounted a transversely positioned mixer blade 123.

As best seen in Figure 4, top cover 105 is provided with four identical apertures 124. In each aperture 124, is secured, as by a press fit, a refrigerating cylinder 112.

Cylinders 112 are provided internally with central axially bored closure members 125. Mounted within member 125 is a conduit 126 secured against leakage by a press fitted member 127. Mounted within conduit 126 so as to leave an annular space for removal of refrigerant from cylinder 112 is a pipe 128 which delivers refrigerant from a source not shown.

On the exterior of cylinder 112 is secured by suitable means such as welding, a flange 130. Flange 130 is a base upon which rides a gear 131 having a loose sliding fit with cylinder 112.

Gear 131 is adapted to engage pinion gear 122 and to be rotated thereby. The tooth bearing flange of gear 131 has secured to the underside thereof the projections 135 of three spaced arms 136. Arms 136 at their lower extremity are provided with horizontal projects 137 which are joined to one another through an axially positioned plate 138. Arms 136 are the bases for scaper blades 139 which ride in contact with the surface of cylinder 112.

It will be understood that this invention is susceptible to modification in order to adapt it to different usages and conditions and, accordingly, it is desired to comprehend such modifications within this invention as may fall within the scope of the appended claims.

I claim:

1. In a method of freeze dehydration for concentrating solutions containing solids, volatile flavoring material and a crystallizable solvent, the steps comprising carrying out said freeze dehydration as batch freezing stages which consists in establishing a refrigerated heat exchange surface, bringing the solution to be concentrated in contact with said surface while the temperature of the surface is maintained below the freezing point of said solvent to cause crystallization and freezing out of said solvent, vigorously agitating said solution while in contact with the refrigerated surface to form fine crystals of said solvent and prevent agglomeration of the same, continuously scraping the refrigerated surface to remove crystals which form thereon to maintain the surface substantially free of crystals to bring about seeding of the solution to cause crystals to form uniformly throughout the body of liquid, moving the refrigerated slushy mass away from the heat exchange surface, and mechanically separating the crystals therefrom to recover a concentrate which contains substantially all of the solids and volatile flavoring material.

2. In a method of freeze dehydration and concentrating solutions containing solids, volatile flavoring material and a crystallizable solvent, the steps comprising carrying out said freeze dehydration as a series of coordinated batch freezing stages wherein each freezing stage comprises establishing a refrigerated heat exchange surface, bringing the solution to be concentrated in contact with said surface while the temperature of the surface is maintained below the freezing point of the solvent and at substantially constant temperature to cause crystallization and freezing out of said solvent, vigorously agitating said solution at high speed while in contact with the refrigerated surface to form fine crystals of said solvent which are substantially free of occluded solids and unagglomerated, continuously scraping the refrigerated surface at slow speed to remove crystals of the solvent for seeding the solution and cause crystals to form uniformly throughout the body of liquid and maintain said refrigerated surface free of crystals, moving the refrigerated mass away from the heat exchange surface, and mechanically separating the crystals therefrom to recover a concentrate which contains substantially all of the solids and volatile flavoring material.

3. In a method of freeze dehydration and concentrating solutions containing solids, volatile flavoring material and water, such as fruit and vegetable juices, the steps comprising carrying out said freeze dehydration as a series of coordinated batch freezing stages wherein each freezing stage comprises establishing a refrigerated heat exchange surface, bringing the solution to be concentrated in contact with said surface while the temperature of the surface is maintained below the freezing point of water to cause crystallization and freezing out of said water as ice crystals, vigorously agitating said solution while in contact with the refrigerated surface to form fine ice crystals which are free and unagglomerated, continuously scraping the refrigerated surface to remove ice crystals for seeding the solution and cause crystals to form uniformly throughout the body of liquid and maintain said refrigerated surface free of ice crystals, moving the refrigerated mass of liquid and ice crystals away from the heat exchange surface, and mechanically separating the ice crystals therefrom to recover a juice concentrate which contains substantially all of the solids and volatile flavoring material.

4. In a method of freeze dehydration and concentrating solutions containing solids, volatile flavoring material and water such as fruit and vegetable juices, the steps comprising carrying out said freeze dehydration as a series of coordinated batch freezing stages wherein each freezing stage comprises establishing a refrigerated heat exchange surface, bringing the solution to be concentrated in contact with said surface while the temperature of the surface is maintained below the freezing point of water to cause crystallization and freezing out of said water as ice crystals, vigorously agitating said solution at high speed while in contact with the refrigerated surface to form fine crystals of said water which are substantially free of occluded solids and unagglomerated, continuously scraping the refrigerated surface at slow speed to remove the ice crystals for seeding the solution and cause crystals to form uniformly throughout the body of liquid and maintain said refrigerated surface free of ice crystals, moving the refrigerated mass of liquid and ice crystals away from the heat exchange surface, and mechanically separating said ice crystals therefrom to recover a juice concentrate which contains substantially all of the solids and volatile flavoring material but is substantially free of water.

(References on following page)

References Cited in the file of this patent

UNITED STATES PATENTS

| | | |
|---|---|---|
| 1,359,911 | Oman | Nov. 23, 1920 |
| 1,738,275 | Baker | Dec. 3, 1929 |
| 1,996,988 | Badger | Apr. 9, 1935 |
| 2,010,548 | Langwell et al. | Aug. 6, 1935 |
| 2,186,887 | Steimbacher | Jan. 9, 1940 |
| 2,337,317 | Eggert | Dec. 21, 1943 |
| 2,559,204 | Wenzelberger | July 3, 1951 |
| 2,559,205 | Wenzelberger | July 3, 1951 |